United States Patent [19]

Badesha

[11] Patent Number: 5,456,987
[45] Date of Patent: * Oct. 10, 1995

[54] INTERMEDIATE TRANSFER COMPONENT COATINGS OF TITAMER AND GRAFTED TITAMER

[75] Inventor: Santokh S. Badesha, Pittsford, N.Y.

[73] Assignee: Xerox Corporation, Stamford, Conn.

[*] Notice: The portion of the term of this patent subsequent to Aug. 9, 2011 has been disclaimed.

[21] Appl. No.: 141,747

[22] Filed: Oct. 27, 1993

[51] Int. Cl.[6] .................................................. B32B 27/00
[52] U.S. Cl. .................. 428/421; 428/35.8; 428/36.9; 428/200; 428/206; 428/411.1; 428/446; 428/447; 428/448; 428/457; 428/906; 492/53; 525/903
[58] Field of Search ........................ 355/275, 256, 355/279, 285, 290, 295; 156/137, 148; 430/126, 98, 99; 427/22; 428/195, 35.8, 35.9, 421, 446, 447, 448, 457, 906, 200, 206, 411.1; 525/903

[56] References Cited

U.S. PATENT DOCUMENTS

| | | | |
|---|---|---|---|
| 3,893,761 | 7/1975 | Buchan et al. | 355/3 |
| 4,065,586 | 12/1977 | Eddy et al. | 427/22 |
| 4,684,238 | 8/1987 | Till et al. | 355/10 |
| 4,690,539 | 9/1987 | Radulski et al. | 355/3 |
| 5,013,624 | 5/1991 | Yu | 430/60 |
| 5,099,286 | 3/1992 | Nishise et al. | 355/272 |
| 5,110,702 | 5/1992 | Ng et al. | 430/99 |
| 5,116,703 | 5/1992 | Badesha | 430/59 |
| 5,119,140 | 6/1992 | Berkes et al. | 355/273 |
| 5,132,743 | 7/1992 | Bujese et al. | 355/274 |
| 5,150,161 | 9/1992 | Bujese | 355/256 |
| 5,233,396 | 8/1993 | Simms et al. | 355/275 |
| 5,254,638 | 10/1993 | Novak | 525/389 |
| 5,285,244 | 2/1994 | Bujese | 355/256 |
| 5,298,956 | 3/1994 | Mammino et al. | 355/275 |
| 5,337,129 | 8/1994 | Badesha | 355/275 |

*Primary Examiner*—Patrick J. Ryan
*Assistant Examiner*—William A. Krynski
*Attorney, Agent, or Firm*—Zosan S. Soong

[57] ABSTRACT

An intermediate toner transfer component is disclosed comprising a substrate and a coating comprised of integral, interpenetrating networks of haloelastomer, titanium oxide, and optionally polyorganosiloxane.

18 Claims, No Drawings

INTERMEDIATE TRANSFER COMPONENT COATINGS OF TITAMER AND GRAFTED TITAMER

CROSS REFERENCE TO RELATED COPENDING APPLICATION

Badesha, U.S. application Ser. No. 08/083,922, filed Jun. 29, 1993, the disclosure of which is totally incorporated by reference, discloses a fuser member comprising a supporting substrate and a layer comprised of integral interpenetrating networks of haloelastomer and titanium oxide, and a composition comprising substantially uniform integral interpenetrating networks of haloelastomer and titanium oxide.

Badesha, U.S. application Ser. No. 08/084,882, filed Jun. 29, 1993, the disclosure of which is totally incorporated by reference, discloses a fuser member comprising a supporting substrate and a layer comprised of integral interpenetrating networks of haloelastomer, titanium oxide, and polyorganosiloxane, and a composition comprising substantially uniform integral interpenetrating networks of haloelastomer, titanium oxide, and polyorganosiloxane.

Badesha, U.S. application Ser. No. 08/141,748, U.S. Pat. No. 5,337,129, "Intermediate Transfer Component Coatings of Ceramer and Grafted Ceramer," , filed concurrently with the instant application, the disclosure of which is totally incorporated by reference.

Badesha et al. U S. application Ser. No. 08/035,023, U.S. Pat. No. 5,340,679, filed Mar. 22, 1993, discloses an intermediate toner transfer component comprised of a substrate and thereover a coating comprised of a volume grafted elastomer, which is a substantially uniform integral interpenetrating network of a hybrid composition of a fluoroelastomer and a polyorganosiloxane, said volume graft having been formed by dehydrofluorination of said fluoroelastomer by a nucleophilic dehydrofluorinating agent, followed by addition polymerization by the addition of an alkene or alkyne functionally terminated polyorganosiloxane and a polymerization initiator.

Badesha et al., U.S. application Ser. No. 08/044,870, filed Apr. 8, 1993, discloses a fuser member comprising a supporting substrate and a layer comprised of integral interpenetrating networks of haloelastomer and silica, and a composition comprising substantially uniform integral interpenetrating networks of haloelastomer and silica.

Badesha et al., U.S. application Ser. No. 08/044,860, filed Apr. 8, 1993, discloses a fuser member comprising a supporting substrate and a layer comprised of integral interpenetrating networks of haloelastomer, silica, and polyorganosiloxane, and a composition comprising substantially uniform integral interpenetrating networks of haloelastomer, silica, and polyorganosiloxane.

BACKGROUND OF THE INVENTION

This invention relates generally to an imaging apparatus and intermediate toner transfer components thereof. More specifically, the present invention is directed to an imaging apparatus and process wherein an electrostatic latent image is formed on an imaging member and developed with a toner, followed by transfer of the developed image to a coated intermediate transfer belt or component and subsequent transfer with very high transfer efficiency of the developed image from the intermediate transfer element to a permanent substrate.

Although known processes and materials are suitable for their intended purposes, a need remains for imaging apparatuses and processes employing intermediate coated transfer elements or components with high transfer efficiencies to and from intermediates, which can be in the form of a belt. In addition, there is a need for imaging apparatuses and processes employing coated intermediate transfer elements that enable generation of full color images with high color fidelity. Further, a need exists for imaging apparatuses and processes employing coated intermediate transfer elements that can be selected for both liquid and dry toner development systems. There is also a need for imaging apparatuses and processes employing intermediate transfer elements that enable simplified and improved registration of superimposed images of different colors on a single substrate sheet to form multicolor or blended color images. Furthermore, there is a need for imaging apparatuses which possess acceptable thermal stability, excellent chemical stability, and also have physical and mechanical stability. There is also a need for imaging apparatuses wherein there are selected low surface energy transfer belts and which belts may be utilized in dry or liquid xerographic imaging and printing systems and processes. Chemical stability as mentioned herein refers, for example, to resistance attack from dry and liquid toners and developers, in view of the contact of the transfer element with the liquid carrier, charge additive, charge directors, toner resins, and pigments. There is also a need for intermediate transfer components which have excellent transfix characteristics and excellent heat transfer characteristics.

Examples of an intermediate transfer member can be found in Ng et al., U.S. Pat. No. 5, 110,702 which discloses non-electrostatic transfer of a toned image using a roll as an intermediate transfer member, and in Buchan et al., U.S. Pat. No. 3,893,761, which discloses an intermediate transfer belt having a polyimide film substrate coated with 0. 1 to 10 mils of silicone rubber or a fluoroelastomer.

Till et al., U.S. Pat. No. 4,684,238 and Raduiski et al., U.S. Pat. No. 4,690,539, disclose single layer intermediate transfer belts composed of polyethylene terephthalate or propylene material which are employed in liquid development methods and apparatus. U.S. Pat. Nos. 4,684,238 and 4,690,539 are hereby totally incorporated by reference.

Berkes et al., U.S. Pat. No. 5,119,140, discloses a single layer intermediate transfer belt fabricated from clear Tedlar™, carbon loaded Tedlar™ or pigmented Tedlar™.

Nishise et al., U.S. Pat. No. 5,099,286, discloses an intermediate transfer belt comprising electrically conductive urethane rubber as the substrate and a layer of polytetrafluoroethylene.

Bujese, U.S. Pat. No. 5,150,161, discloses suitable materials for laminate intermediate transfer members in a color printing apparatus, reference for example col. 7, line 48 to col. 8, line 38, and col. 11, lines 46–53.

SUMMARY OF THE INVENTION

It is an object of the present invention to provide coated intermediate transfer components suitable for either liquid and/or dry toner development systems.

It is also an object in embodiments to provide imaging apparatus and intermediate toner transfer components exhibiting high toner transfer efficiencies to and from the intermediate transfer component.

It is a further object in embodiments to enable generation of full color images with high color fidelity in imaging apparatus employing an intermediate transfer component.

It is an additional object to provide new intermediate toner transfer components which possess one or more of the following attributes: excellent chemical stability wherein the titamer and grafted titamer compositions minimally react or do not react with the components of the liquid and dry toners and developers including the toner resin, pigment(s)/dye(s), charge control additive(s), charge director(s), and carrier fluid; low surface energy; suitable dielectric thickness; suitable electrical conductivity; suitable thermal conductivity; good physical and mechanical stability; and good conformability.

These objects and others are accomplished in embodiments by providing an intermediate toner transfer component comprising a substrate and a coating comprised of integral, interpenetrating networks of haloelastomer, titanium oxide, and optionally polyorganosiloxane.

There is further provided in embodiments an electrostatographic printing apparatus comprising: (a) an imaging member for recording a latent image; (b) a developing device for developing the latent image with a toner composition to form a toner image; (c) an intermediate toner transfer component, positioned adjacent the imaging member, comprising a substrate and a coating comprised of integral interpenetrating networks of haloelastomer, titanium oxide, and optionally polyorganosiloxane; and (d) a transfer apparatus for transferring the toner image from the imaging member to the intermediate toner transfer component.

DETAILED DESCRIPTION

As used herein, the term titamer refers to, in embodiments of the present invention, a composition comprised of substantially uniform integral interpenetrating networks of haloelastomer and titanium oxide, wherein both the structure and the composition of the haloelastomer and titanium oxide networks are substantially uniform when viewed through different slices of the intermediate transfer member. As used herein, the phrase grafted titamer refers to a composition comprised of substantially uniform integral interpenetrating networks of haloelastomer, titanium oxide, and polyorganosiloxane, wherein both the structure and the composition of the haloelastomer, titanium oxide, and polyorganosiloxane are substantially uniform when viewed through different slices of the intermediate transfer member.

The phrase interpenetrating network refers to the intertwining of the haloelastomer and titanium oxide polymer strands for the titamer, and to the intertwining of the haloelastomer, titanium oxide, and polyorganosiloxane polymer strands for the grafted titamer.

The phrases "titanium oxide," "network of titanium oxide," "titanium oxide network," and similar phrases refer to alternating, covalently bound atoms of titanium and oxygen, wherein the alternating atoms of titanium and oxygen may exist in a linear, branched, and/or lattice pattern. The atoms of titanium and oxygen exist in a network and not as discrete particles.

Unless otherwise indicated, the term coating refers to the titamer or the grafted titamer. In embodiments, the coating of the titamer or the grafted titamer is the layer, i.e., top layer, of the intermediate transfer component which comes into contact with the toner or developer.

In embodiments, the coating on the substrate is a titamer composition comprised of substantially uniform, integral, interpenetrating networks of haloelastomer and titanium oxide. The haloelastomer is present in an effective amount in the titamer, preferably ranging from about 99 to about 25% by weight based on the weight of the coating, and more preferably ranging from about 95 to about 50% by weight based on the weight of the coating. The titanium oxide network is present in an effective amount in the titamer, preferably ranging from about 1 to about 50% by weight based on the weight of the coating, and more preferably ranging from about 5 to about 25% by weight based on the weight of the coating. In preferred embodiments, a coupler, especially an amine coupler, also may be present in an effective amount in the titamer, preferably ranging from about 0.5 to about 15% by weight based on the weight of the coating, and more preferably ranging from about 0.5 to about 5% by weight based on the weight of the coating. A representative structural formula for the titamer is as follows:

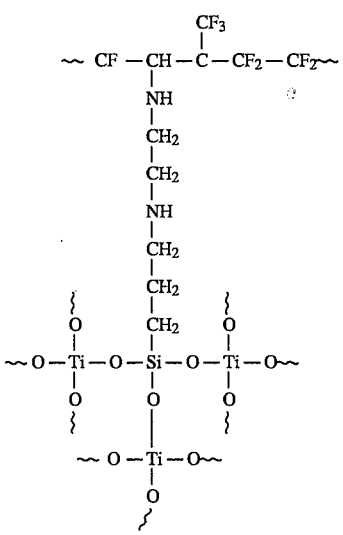

In the above formula, the symbol "∼" represents the continuation of the polymeric network.

In embodiments, the coating on the substrate is a grafted titamer composition comprised of substantially uniform, integral, interpenetrating networks of haloelastomer, titanium oxide, and polyorganosiloxane. The haloelastomer is present in an effective amount in the grafted titamer, preferably ranging from about 99 to about 25% by weight based on the weight of the coating, and more preferably ranging from about 95 to about 50% by weight based on the weight of the coating. The titanium oxide is present in an effective amount in the grafted titamer, preferably ranging from about 1 to about 50% by weight based on the weight of the coating, and more preferably ranging from about 5 to about 25% by weight based on the weight of the coating. The polyorganosiloxane is present in an effective amount in the grafted titamer, preferably ranging from about 1 to about 50% by weight based on the weight of the coating, and more preferably ranging from about 5 to about 25% by weight based on the weight of the coating. In preferred embodiments, a coupler, especially an amine coupler, also may be present in an effective amount in the grafted titamer, preferably ranging from about 0.5 to about 15% by weight based on the weight of the coating, and more preferably ranging from about 0.5 to about 5% by weight based on the weight of the coating.

A representative structural formula for the grafted titamer is as follows:

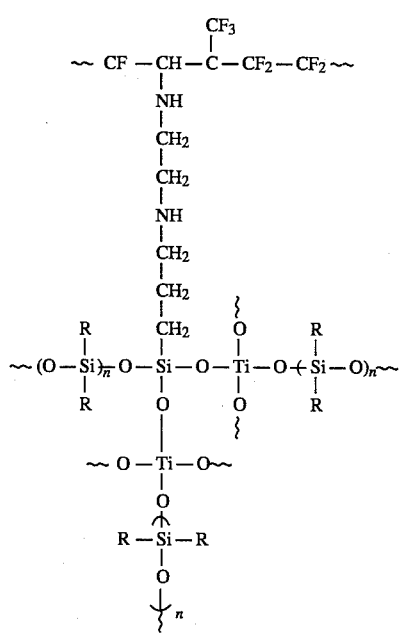

In the above formula, R is the R group of the polyorganosiloxane and may be a substituent as defined herein for the R group of the polyorganosiloxane; n may be as defined herein for the n of the polyorganosiloxane; and the symbol "~" represents the continuation of the polymeric network.

The haloelastomer may be any suitable halogen containing elastomer such as a chloroelastomer, a bromoelastomer, or the like, mixtures thereof, and preferably is a fluoroelastomer. Fluoroelastomer examples include those described in detail in U.S. Pat. No. 4,257,699 to Lentz, as well as those described in Eddy et al., U.S. Pat. No. 5,017,432 and Ferguson et al., U.S. Pat. No. 5,061,965, the disclosures of which are totally incorporated by reference. As described therein these fluoroelastomers, particularly from the class of copolymers and terpolymers of vinylidenefluoride hexafluoropropylene and tetrafluoroethylene, are known commercially under various designations as VITON A TM™, VITON E™, VITON E60C™, VITON E430™, VITON 910™, VITON GH™ and VITON GF™. The VITON™ designation is a Trademark of E.I. Dupont deNemours, Inc. Other commercially available materials include FLUOREL 2170™, FLUOREL 2174™, FLUOREL 2176™, FLUOREL 2177™ and FLUOREL LVS 76™, FLUOREL™ being a Trademark of 3M Company. Additional commercially available materials include AFLAS™ a poly(propylene-tetrafluoroethylene), FLUOREL II™ (LII900) a poly(propylene-tetrafluoroethylenevinylidenefluoride) both also available from 3M Company as well as the TECNOFLON™ compositions identified as FOR-60KIR, FOR-LHF, NM, FOR-THF, FOR-TFS, TH, TN505 available from Montedison Specialty Chemical Co. Typically, these fluoroelastomers are cured with a nucleophilic addition curing system, such as a bisphenol crosslinking agent with an organophosphonium salt accelerator as described in further detail in the above referenced Lentz Pat. No. and in U.S. Pat. No. 5,017,432. In a particularly preferred embodiment, the fluoroelastomer is one having a relatively low quantity of vinylidenefluoride, such as in VITON GF™, available from E.I. Dupont deNemours, Inc. The VITON GF™ has 35 mole percent vinylidenefluoride, 34 percent hexafluoropropylene and 29 mole percent tetrafluoroethylene with 2 percent cure site monomer. It is generally cured with bisphenol phosphonium salt, or a conventional aliphatic peroxide curing agent.

It is believed that some of the aforementioned haloelastomers and others that can be selected have the following formulas

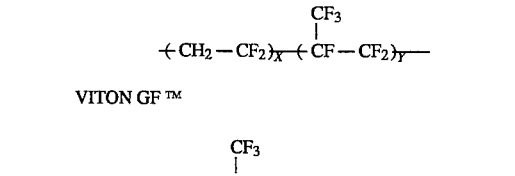

VITON GF ™

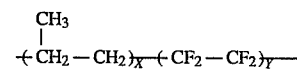

AFLAS ™

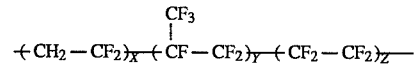

FLUOREL I ™

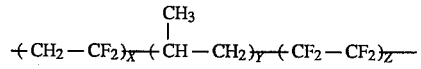

FLUOREL II ™

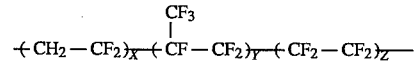

TECNOFLON ™

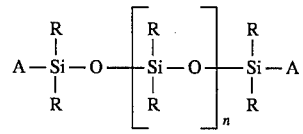

wherein the subscripts, such as x, y, and z, represent the number of repeating segments.

The source compound of the titanium oxide network may be a compound of the formula $Ti(X)_4$, and especially a titanium tetraalkoxide compound. In this formula, X may be for example OR, where R is an alkyl having 1 to 24 carbon atoms such as methyl, ethyl, propyl, butyl, pentyl, hexyl, heptyl, octyl, and the like; a halogen; hydroxy; or hydride. Preferred source compounds for the titanium oxide network include titanium isobutoxide.

Preferred examples of the polyorganosiloxane having functionality according to the present invention are of the formula:

$$A-\underset{R}{\overset{R}{Si}}-O-\left[\underset{R}{\overset{R}{Si}}-O\right]_n-\underset{R}{\overset{R}{Si}}-A$$

where R independently is an alkyl having for example from 1 to 24 carbon atoms, and preferably from 1 to 12 carbon atoms; alkenyl having for example from 2 to 24 carbon atoms, and preferably from 1 to 12 carbon atoms; or aryl having for example from 6 to 24 carbon atoms, and preferably from 6 to 18 carbon atoms, wherein the aryl group is optionally substituted with an amino, hydroxy, mercapto or an alkyl having for example from 1 to 24 carbon atoms, and preferably from 1 to 12 carbon atoms, or alkenyl group having from 2 to 24 carbon atoms, and preferably from 2 to 12 carbon atoms. In preferred embodiments, R is independently selected from methyl, ethyl, and phenyl. The functional group A may be an alkene or alkyne group having for example from 2 to 8 carbon atoms, preferably from 2 to 4 carbon atoms, optionally substituted with an alkyl having for example from 1 to 24 carbon atoms, and preferably from 1 to 12 carbon atoms, or an aryl group having for example from 6 to 24 carbon atoms, and preferably from 6 to 18 carbon atoms. Functional group A can also be mono-, di-, or trialkoxysilane having 1 to 10, preferably 1 to 6, carbon atoms in each alkoxy group, hydroxy, or halogen. Preferred alkoxy groups include methoxy, ethoxy, and the like. Preferred halogens include chlorine, bromine and fluorine. In the above formula, n represents the number of segments and may be for example 2 to 350, and preferably from about 5 to about 100. In the above formula, typical R groups include methyl, ethyl, propyl, octyl, vinyl, allylic crotnyl, phenyl, naphthyl and phenanthryl and typical substituted aryl groups are substituted in the ortho, meta and para positions with lower alkyl groups having less than 15 carbon atoms, and preferably from 1 to 10 carbon atoms. In a preferred embodiment, n is between 60 and 80. Typical alkene and alkenyl functional groups include vinyl, acrylic, crotonic and acetenyl which may typically be substituted with methyl, propyl, butyl, benzyl, and tolyl groups, and the like.

The polyorganosiloxane in the grafted titamer differs from the formula disclosed herein for the functionally terminated polyorganosiloxane reactant, since the functional ends may have undergone reactions with the titanium oxide network, haloelastomer, amine coupler, or other polyorganosiloxane. For example, functional group A if it is, for instance, trialkoxysilane, may undergo hydrolysis followed by condensation reactions with the pendant functional groups of the amine coupler which may be already attached to the haloelastomer or the titanium oxide network. In embodiments, the first step is that the siloxy and titanyl groups undergo hydrolysis. The reaction will proceed with only some of the siloxy and titanyl groups undergoing hydrolysis, but ultimately most of the groups will undergo hydrolysis. The second step is the condensation reactions giving rise to the Si—O—Si and/or Ti—O—Si linkages. For this reaction, one may optionally employ a catalyst which can be an acid like acetic, hydrochloric, sulfuric, and the like. The chemistry would be similar if functional group A is hydroxy or a halogen. If functional group A is alkyne or alkene, then an initiator such as benzoyl peroxide is optionally employed and, in embodiments, one of the pendant groups on the coupler typically is also an alkene or alkyne.

Adjuvants and fillers may be optionally incorporated in the titamer and the grafted titamer compositions in accordance with the present invention in an effective amount, preferably ranging from about 1 to about 50% by weight, and more preferably from about 3 to about 15% by weight, based on the weight of the coating. Such adjuvants and fillers typically include for example coloring agents, reinforcing fillers, crosslinking agents, processing aids, accelerators and polymerization initiators, and the like. Specific examples of fillers and adjuvants include silica, carbon black, iron oxide, aluminum oxide, aluminum nitride, boron nitride, and the like.

In embodiments, the titamer may be prepared by dissolving an effective amount of the haloelastomer, e.g., preferably about 1 to about 35% by weight, more preferably about 5 to about 15% by weight, in an effective amount of a suitable solvent, such as an aliphatic hydrocarbon including for example methyl ethyl ketone, methyl isobutyl ketone and the like at any effective temperature, preferably 25° C. An amine based coupler having one or more pendant functional groups is added in an effective amount, e.g., preferably about 1 to about 15% by weight, more preferably about 3 to about 10% by weight relative to the weight of the haloelastomer, followed by stirring of the solution for about 15 to about 60 minutes at a temperature of about 45 to about 100° C. An effective amount of a titanium oxide network source compound such as titanium isobutoxide, e.g., preferably about 1 to about 75% weight, more preferably 5 to about 50% by weight relative to the weight of haloelastomer, is then added and heating is continued at a temperature of about 45 to about 100° C. for an additional 20 minutes to about 10 hours. Any effective sequence of addition of the various components may be used to prepare the titamer. For example, in embodiments, the haloelastomer may be added to a solvent already containing the amine coupler and/or the source compound for the titanium oxide network. The preferred time of reaction is about 4 hours at about 65° C.

In embodiments, the grafted titamer may be prepared by dissolving an effective amount of the haloelastomer, e.g., preferably about 1 to about 35% by weight, more preferably about 5 to about 15% by weight, in an effective amount of a suitable solvent, such as an aliphatic hydrocarbon including for example methyl ethyl ketone, methyl isobutyl ketone and the like at any effective temperature, preferably 25° C. An amine based coupler having one or more pendant functional groups in an effective amount, e.g., preferably about 1 to about 15% by weight, more preferably about 2 to about 10% by weight relative to the weight of the haloelastomer is added, followed by stirring of the solution for about 15 to about 60 minutes at a temperature of about 45 to about 100° C. An effective amount of a source compound for the titanium oxide network such as titanium isobutoxide, e.g., preferably about 1 to about 75% by weight, more preferably about 5 to about 50% by weight, relative to the weight of haloelastomer, is then added and heating is continued at a temperature of about 45 to about 100° C. for an additional 20 minutes to about 10 hours. An effective amount of a functionally terminated polyorganosiloxane, e.g., preferably about 5 to about 75% by weight, more preferably about 10 to about 50% by weight, relative to the weight of the haloelastomer, is then added, optionally with a polymerization initiator such as benzoyl peroxide in an effective concentration, e.g., preferably about 0.5 to about 10% by weight, more preferably about 2 to about 5% by weight, relative to the weight of polyorganosiloxane, followed by heating at a temperature of about 45 to about 100° C. for an additional 20 minutes to about 10 hours. Any effective sequence of addition of the various components may be used to prepare the grafted titamer. For example, in embodiments, the haloelastomer may be added to a solvent already containing the amine coupler and/or the source compound for the titanium oxide network. Also, the polyorganosiloxane may be added at any effective stage, and preferably prior to or during the formation of the networks of the haloelastomer and titanium oxide polymeric strands. The preferred reaction time is about 4 hours at about 65° C.

In preferred embodiments, the processes to prepare the titamer and the grafted titamer may also include other components to facilitate the preparation thereof. For example, a nucleophilic curing agent for the haloelastomer such as Viton Curative No. 50 and diamines such as Diac available from E.I. Dupont deNemours, Inc. may be employed at an effective concentration, preferably about 1 to about 15% by weight, more preferably about 2 to about 10% by weight, relative to the weight of the haloelastomer. Viton Curative No. 50, which incorporates an accelerator (a quaternary phosphonium salt or salts) and a crosslinking agent, such as bisphenol AF in a single curative system, may be added in a 3 to 7 percent solution predissolved to the haloelastomer compound. Also, the basic oxides such as MgO and/or $Ca(OH)_2$ in effective amounts, preferably about 0.5 to about 10% by weight, more preferably about 1 to about 3% by weight, relative to the weight of the haloelastomer, may be added in particulate form to the solution mixture.

The mixture of the titamer/grafted titamer with the curative and the oxides is then ball milled for about 2 to about 24 hours and preferably, about 5 to about 15 hours to obtain a fine dispersion of the oxides. The curative component can also be added after ball milling in a solution form. The solution of the curative is generally prepared by dissolving Viton Curative No. 50 in methyl ethyl ketone ("MEK") or methyl isobutyl ketone ("MIBK"). The concentration of the solids, i.e., the titamer/grafted titamer with the curative and the oxides, can vary from about 5% to 25% by weight, and preferably from about 10–15% by weight.

The curing agent for the haloelastomer crosslinks the haloelastomer chains by creating for example carbon-oxygen-carbon crosslinking where the curing agent is for example a bisphenol type compound such as Viton Curative No. 50. The networks of haloelastomer, optional polyorganosiloxane and titanium oxide are formed in the solution and the crosslinking action of the curing agent does not appear to interfere with the formation of the haloelastomer, polyorganosiloxane and titanium oxide networks.

The amine coupler is selected from the group of strong nucleophilic agents such as peroxides, hydrides, bases, amines, and the like. The preferred agents are selected from the group consisting of primary, secondary and tertiary, aliphatic and aromatic amines, where the aliphatic and aromatic groups have from 2 to 15 carbon atoms. The coupler is selected from the groups which have multifunctionality, one of which is capable of dehydrohalogenation of the haloelastomer thereby creating unsaturation sites followed by an addition reaction. This would result in a product which will have pendant coupler chains. The other functionalities on the coupler are desired to undergo further reactions with the source compound for the titanium oxide network, and functionally terminated polyorganosiloxanes. The examples of nucleophilic functionality include amines, peroxides, hydrides, and the like. Functionalities which would undergo reactions with the source compound for the titanium oxide network are siloxy, hydride, halogen, hydroxy, and the like. Functionalities which would undergo reaction with the polyorganosiloxanes for grafted titamers could be alkene, alkyne, siloxy, hydride, halogen, hydroxy, and the like. The amine coupler includes aliphatic and aromatic diamines and triamines having from 2 to 15 carbon atoms where the aromatic groups may be benzene, toluene, naphthalene or anthracene, and the like. It is generally preferred for the aromatic diamines and triamines that the aromatic group be substituted in the ortho, meta and para positions. Typical substituents include lower alkylamino groups such as ethylamino, propylamino and butylamino with propylamino being preferred. Following are examples of commercially available couplers which can be used: N-(2-aminoethyl-3-aminopropyl)-trimethoxysilane available as A0700 from Huls America Inc.; 3-(N-strylmethyl-2-aminoethylamino)propyltrimethoxysilane hydrochloride available as S-1590 from Huls America Inc.; and (aminoethylaminomethyl)phenylethyltrimethoxysilane available as A0698 from Huls America Inc.

Although it is not desired to be limited by theory, the following reactions are believed to occur during preparation of the titamer. An amine coupler having at least one pendant functional group, such as silane, dehydrohalogenates the haloelastomer, resulting in the elimination of a hydrohalogen acid such as hydrofluoric acid and the generation of unsaturated carbon to carbon double bonds on the haloelastomer. The amine coupler adds to one of the carbon atoms of the carbon to carbon double bonds, thereby forming a nitrogen to carbon bond. A hydrolyzable source compound for the titanium oxide network ("source compound") such as titanium tetraisobutoxide (also referred to herein as titanium isobutoxide) is added, which undergoes hydrolysis, and the hydrolyzed source compound reacts with the pendant silane groups of the amine coupler in for example a condensation type reaction. The pendant functional groups of the amine coupler act as initiation sites for the titanium oxide network and the titanium oxide network grows by the coupling of additional hydrolyzed source compounds to the network via titanium-oxygen bonds by for example condensation type reactions. There is formed a generally homogeneous incorporation of titanium oxide network into the haloelastomer network. The various polymeric strands of the titamer are integral interpenetrating networks. The term integral as applied to the titamer refers to the linking together of the haloelastomer and the titanium oxide networks via for example a coupler, especially an amine coupler, wherein one end of the coupler is covalently bonded to the haloelastomer and another end of the coupler is covalently bonded to the titanium oxide network.

Although it is not desired to be limited by theory, the following reactions are believed to occur during preparation of the grafted titamer. An amine coupler having at least one pendant silane group dehydrohalogenates the haloelastomer, resulting in the elimination of a hydrohalogen acid such as hydrofluoric acid and the generation of unsaturated carbon to carbon double bonds on the haloelastomer. The amine coupler adds to one of the carbon atoms of the carbon to carbon double bonds, thereby forming a nitrogen to carbon bond. A hydrolyzable source compound for the titanium oxide network ("source compound") such as titanium tetraisobutoxide (also referred to herein as titanium isobutoxide) is added, which undergoes hydrolysis, and the hydrolyzed source compound reacts with the pendant silane groups of the amine coupler in for example a condensation type reaction. The pendant functional groups of the amine coupler act as initiation sites for the titanium oxide network and the titanium oxide network grows by the coupling of additional hydrolyzed source compounds to the network via titanium-oxygen bonds by for example condensation type reactions. A functionally terminated polyorganosiloxane is added to the solution comprised of the haloelastomer and the source compound for the titanium oxide network, with such addition preferably occurring after the initiation of the formation of the intertwining polymeric strands of the haloelastomer and titanium oxide. Depending on the nature of its terminal functionality, the polyorganosiloxane can attach to one or more of the following: unsaturation sites on the haloelastomer, i.e., the carbon to carbon double bonds, by, for example, a free radical polymerization route; the titanium oxide polymeric strands via a silicon to oxygen to titanium covalent bonds by for example a condensation type reaction; or the pendant functional groups of the amine coupler by for example a silicon to oxygen covalent bond involving for instance a condensation type reaction. In embodiments, to facilitate condensation reactions to promote the growth of the various networks, all the functional groups (e.g., siloxy) of the amine coupler, source compound for the titanium oxide network, and polyorganosiloxane undergo hydrolysis. In embodiments where the polyorganosiloxane has a terminal functionality of an alkene or alkyne, the polyorganosiloxane attaches to the unsaturation sites on the haloelastomer. In embodiments where the terminal functionality is an alkoxy such as ethoxy, the polyorganosiloxane attaches to the titanium oxide network and/or the pendant functional groups of the amine coupler. The polyorganosiloxane may polymerize via its functional groups by for example condensation type reactions. The various polymeric strands of the grafted titamer are integral interpenetrating networks. The term integral as applied to the grafted titamer refers to one or more of the following: the linking together of the haloelastomer and the titanium oxide networks via for example a coupler, especially an amine coupler, wherein one end of the coupler is covalently bonded to the haloelastomer and another end of the coupler is covalently bonded to the titanium oxide network, covalent bonding of the polyorganosiloxane with the haloelastomer via carbon to carbon bonds, and covalent bonding of the polyorganosiloxane with the titanium oxide network via silicone to oxygen to titanium covalent bonds. Since the polyorganosiloxane may bind to the titanium oxide network, the grafted titamer in certain embodiments may contain polymeric strands containing segments of both titanium oxide and polyorganosiloxane.

Providing an effective layer of the titamer or the grafted titamer on the substrate may be accomplished by any suitable known method such as by spraying, dipping, flow, web or the like a solution of the homogeneous suspension of the titamer/grafted titamer to a level of film of preferably about 10 to about 250 microns in thickness, and more preferably about 15 to about 75 microns in thickness. While molding, extruding and wrapping techniques are alternative means which may be used, it is preferred to spray successive applications of the solution containing the titamer/grafted titamer. When the desired thickness of coating is obtained, the coating is cured, by any suitable known method, and thereby bonded to the surface of the intermediate toner transfer component. A typical step curing process is heating for about 2 hours at about 93° C. followed by about 2 hours at about 149° C. followed by about 2 hours at about 177° C. followed by about 16 hours at about 208° C. In an alternative procedure, the solvent may be removed by evaporation by known means, the titamer/grafted titamer rinsed with a hydrocarbon solvent such as hexane to remove unwanted reactants, if any, and the titamer/grafted titamer redissolved in the original solvent followed by the addition of Viton Curative No. 50 and the subsequent formation of the coating. Curing may reduce the thickness of the titamer/grafted titamer layer, thereby resulting in a coating having a thickness ranging for example from about 8 to about 220 microns, and preferably from about 10 to about 125 microns.

Examples of materials for the substrate include polyvinyl fluoride, such as TEDLAR®, available from E.I. DuPont de Nemours & Company, polyvinyl fluoride loaded with conductive or dielectric fillers such as carbon particles, titanium dioxide, barium titanate, or any other filler capable of decreasing dielectric thickness, polyvinylidene fluoride, such as KYNAR®, available from Pennwalt Corporation, polyvinylidene fluoride loaded with conductive or dielectric fillers such as carbon particles, titanium dioxide, barium titanate, or any other filler capable of decreasing dielectric thickness, certain papers, such as Xerox Corporation 4024 paper or Xerox Corporation Series 10 paper, and the like. In addition, metals that can be coated include aluminum, copper, brass, nickel, zinc, chromium, stainless steel, semi-transparent aluminum, steel, cadmium, silver, gold, indium, tin, and the like. Metal oxides, including tin oxide, indium tin oxide, and the like, are also suitable. Any other material having the desired charge relaxation characteristics can also be employed. Fillers employed to alter the relaxation time of a material may be present in any amount necessary to effect the desired relaxation time; typically, fillers are present in amounts of from 0 to about 80 percent by weight. When paper or other materials for which conductivity is affected by relative humidity is used as the substrate, the relative humidity may have to be controlled during the imaging process to maintain the intermediate transfer element at the desired charge relaxation time. In general, intermediate transfer elements of materials for which the charge relaxation time changes significantly with relative humidity perform optimally at relative humidities of 60 percent or less. Preferably, the substrate is a metal, a metal oxide, a thermoplastic or a thermosetting organic film, including the materials disclosed herein. In embodiments, the substrate comprises polyimide, optionally including carbon black.

In embodiments, the intermediate transfer component is fabricated with one or more intermediate layers between the titamer/grafted titamer and the substrate. It is preferred that a single intermediate layer of an adhesive is employed in an effective amount where the intermediate layer may have a thickness ranging for example from about 0.1 mil to about 3 mils thick, and more preferably from about 1 mil to about 2 mils thick. Examples of adhesives include: THIOXON 403/404™ and THIOXON 330/301™ both available from Morton International of Ohio; a silane coupling agent such as Union Carbide A1100 which is an amino functional siloxane; epoxy resins including bisphenol A epoxy resins available for example from Dow Chemical Company such as Dow TACTIX 740™, Dow TACTIX 741™, and Dow TACTIX 742™, and the like, optionally with a crosslinker or curative such as Dow H41 available from the Dow Chemical Company.

The intermediate toner transfer component of the present invention may be employed in any suitable electrostatographic printing apparatus. The printing apparatus can generate the electrostatic latent image by any appropriate methods and devices. For example, electrophotographic processes can be employed, wherein an image is formed on an imaging member by exposure of a photosensitive imaging member to light in an imagewise pattern. In addition, the image can be generated by ionographic processes, wherein the image is formed on a dielectric imaging member by applying a charge pattern to the imaging member in imagewise fashion.

Any suitable developing processes and materials can be employed by the printing apparatus of the instant invention to develop the latent image. For example, dry development processes can be employed, either single component development processes in which the developer material is comprised of black or color toner particles, or two component development processes, wherein the developer material comprises black or color toner particles and carrier particles. Typical dry toners and developers are also disclosed in, for example, U.S. Pat. No. 4,937,166, U.S. Pat. No. 4,935,326, U.S. Pat. No. 3,590,000, U.S. Pat. No. 3,079,342, and U.S. Pat. No. Re. 25,136, the disclosures of each of which are totally incorporated herein by reference. In addition, development can be effected with liquid developers comprised of a liquid carrier and black or color toner particles dispersed therein. Liquid developers are disclosed, for example, in U.S. Pat. No. 2,890,174 and U.S. Pat. No. 2,899,335, and copending patent applications U.S. Ser. No. 986,316 (D/91310), U.S. Ser. No. 013,132, U.S. Pat. No. 5,395,725

(D/90095C), U.S. Ser. No. 009,202 (D/92570) and U.S. Ser. No. 009,192 (D/92571), the disclosures of each of which are totally incorporated herein by reference.

Any suitable conventional electrophotographic development technique can be utilized to deposit toner particles on the electrostatic latent image on the imaging member. Well known electrophotographic development techniques include magnetic brush development, cascade development, powder cloud development, electrophoretic development, and the like. Magnetic brush development is more fully described in, for example, U.S. Pat. No. 2,791,949, the disclosure of which is totally incorporated herein by reference; cascade development is more fully described in, for example, U.S. Pat. No. 2,618,551 and U.S. Pat. No. 2,618,552, the disclosures of each of which are totally incorporated herein by reference; powder cloud development is more fully described in, for example, U.S. Pat. No. 2,725,305, U.S. Pat. No. 2,918,910, and U.S. Pat. No. 3,015,305, the disclosures of each of which are totally incorporated herein by reference; and liquid development is more fully described in, for example, U.S. Pat. No. 3,084,043, the disclosure of which is totally incorporated herein by reference.

The intermediate transfer component employed for the present invention can be of any suitable configuration. Examples of suitable configurations include a sheet, a web, a foil, a strip, a coil, a cylinder, a drum, an endless belt, an endless mobius strip, a circular disc, or the like. Typically, the transfer element has a thickness of from about 2 to about 10 mils.

The coated toner transfer components, or belts of the present invention in embodiments can have a charge relaxation time of no more than about $2 \times 10^2$ seconds to ensure efficient transfer from the intermediate to the substrate. The lower limit of suitable charge relaxation times is theoretically unlimited, and conductive materials, such as metals, can be employed as the transfer element. While not being limited by any theory, however, it is believed that the lower limit on the charge relaxation time for an intermediate transfer element in any given situation will be determined by the conductivity of the receiving substrate to which the toner image is ultimately transferred. Specifically, no shorting should occur between the intermediate transfer component and the substrate around the toner piles constituting the image, since shorting would result in little or no transfer field to effect transfer from the intermediate to the substrate. Typically, for transfer to paper, the charge relaxation time is from about $1 \times 10^{-3}$ seconds to about $2 \times 10^2$ seconds. The charge relaxation time ($\tau$) of a material is generally a function of the dielectric constant (K), the volume resistivity ($\rho$) of that material, and the permittivity of free space ($\epsilon_0$, a constant equal to $8.854 \times 10^{-14}$ farads per centimeter), wherein $\tau = K\epsilon_0\rho$.

The intermediate transfer components of the instant invention may be employed in either an image on image transfer or a tandem transfer of a toned image(s) from the photoreceptor to the intermediate transfer component. In an image on image transfer, the color toner images are first deposited on the photoreceptor and all the color toner images are then transferred simultaneously to the intermediate transfer component. In a tandem transfer, the toner image is transferred one color at a time from the photoreceptor to the same area of the intermediate transfer component.

The developed image on the coated intermediate transfer element is subsequently transferred to a substrate. Preferably, prior to transfer the developed image on the intermediate is charged by, for example, exposure to a corotron to ensure that all of the toner particles are charged to the same polarity, thereby enhancing transfer efficiency by eliminating any wrong-sign toner. Wrong-sign toner is toner particles that have become charged to a polarity opposite to that of the majority of the toner particles and the same as the polarity of the latent image. Wrong-sign toner particles typically are difficult to transfer to a substrate. Examples of substrates include paper, transparency material such as polyester, polycarbonate, or the like, cloth, wood, or any other desired material upon which the finished image will be situated. If desired, the transferred developed image can thereafter be fused to the substrate by conventional means. Typical, well known electrophotographic fusing techniques include heated roll fusing, flash fusing, oven fusing, laminating, vapor fusing, adhesive spray fixing, and the like.

Transfer of the developed image from the imaging member to the intermediate transfer element and transfer of the image from the intermediate transfer element to the substrate can be by any suitable technique conventionally used in electrophotography, such as corona transfer, pressure transfer, bias roll transfer, and combinations of those transfer means, and the like. In the situation of transfer from the intermediate transfer medium to the substrate, transfer methods such as adhesive transfer, wherein the receiving substrate has adhesive characteristics with respect to the developer material, can also be employed. Typical corona transfer entails contacting the deposited toner particles with the substrate and applying an electrostatic charge on the surface of the substrate opposite to the toner particles. A single wire corotron having applied thereto a potential of between about 5,000 and about 8,000 volts provides satisfactory transfer. In a specific process, a corona generating device sprays the back side of the image receiving member with ions to charge it to the proper potential so that it is tacked to the member from which the image is to be transferred and the toner powder image is attracted from the image bearing member to the image receiving member. After transfer, a corona generator charges the receiving member to an opposite polarity to detack the receiving member from the member that originally bore the developed image, whereupon the image receiving member is separated from the member that originally bore the image.

Bias roll transfer is another method of effecting transfer of a developed image from one member to another. In this process, a biased transfer roller or belt rolls along the surface of the receiving member opposite to the surface that is to receive the developed image. Further data concerning bias roll transfer methods is provided in, for example, U.S. Pat. No. 3,847,478, U.S. Pat. No. 3,942,888, and U.S. Pat. No. 3,924,943, the disclosures of each of which are totally incorporated herein by reference.

The invention will now be described in detail with respect to specific preferred embodiments thereof, it being understood that these examples are intended to be illustrative only and the invention is not intended to be limited to the materials, conditions or process parameters recited herein. All percentages and parts are by weight unless otherwise indicated. As used herein, room temperature, ambient temperature, and ambient conditions refer to a temperature of about 25° C.

EXAMPLE I

A stainless steel belt (12 inches width×36 inches length×2 mils thickness) was abraded with sand paper, then degreased, scrubbed with an abrasive cleaner, and thoroughly washed with water. An epoxy primer THIOXON 330/301™ was then applied to a thickness of 2 to 3 tenths of a mil (5 to 7.5 micrometers), air dried at ambient conditions for 30 minutes and baked at 150° C. for 30 minutes. Subsequently, the primed belt was provided with a coating of a titamer which was prepared as follows. To prepare the titamer, a stock solution of VITON GF™ was prepared by dissolving 250 g of VITON GF™ in 2.5 liters of methylethyl ketone (MEK) with stirring at room temperature. A four liter plastic bottle and a moving base shaker were used to prepare the stock solution. Approximately one hour to two hours was utilized to accomplish the dissolution. The above solution was then transferred to a four liter Erlenmeyer flask and 25 ml of the amine dehydrofluorinating agent, N-2-aminoethyl-3 -aminopropyltrimethoxy-silane, (available as A0700 from Huls America Inc.) was added. The contents of the flask were then stirred using a mechanical stirrer while maintaining the temperature between 55° and 60° C. After stirring for 30 minutes, 62.5 grams of titanium isobutoxide (about 25% by weight based on weight of VITON GF™), available from Huls America Inc., was added and stirring continued for another five minutes. About 25 grams of acetic acid was then added. The stirring was continued while the contents of the flask were heated at around 65° C. for another 4 hours. During this time the color of the solution turned light yellow. The above yellow solution was then cooled to room temperature. To the above solution was then added 5 grams of magnesium oxide, 2.5 grams of calcium hydroxide and 12.5 grams of E.I. DuPont CURATIVE VC50™. The above contents were then ball jarred with ceramic balls as media for 17 hours. The solution was then diluted to about 5 liters with MEK. This dispersion was then spray coated onto the above primed belt to a dry thickness of 4.5 mils to result in a belt overcoated with a titamer composition. The dry titamer film was then cured by the following heating procedure: 2 hours at 93° C., 2 hours at 149° C., 2 hours at 177° C., and thereafter heating for 16 hours at 208° C. The thickness of the cured titamer film as determined by permoscope was found to be 3 mils.

Since determination of the mechanical properties of the titamer film on the belt may be detrimental to the integrity of the belt, testing was performed on a separate titamer film prepared by the following procedure: A part of the above titamer dispersion (less than 2 liters) was spray coated onto a 10 inches×14 inches steel substrate. The dry titamer film was then removed from the substrate by peeling and then cured by the above-mentioned heating procedure. The thickness of the cured titamer film as determined by permoscope was found to be 10.1 mils. The mechanical properties were determined by Instron Model 1123 (Standard Test Protocol ASTM 412) and the toughness was found to be 11,820 lb-in/in$^3$. The surface energy, determined by a Goniometer available from Rame-hart, Inc. of New Jersey, was found to be 20.1 dynes/cm. The film, when soaked in a liquid toner for 24 hours at ambient temperature, did not show any visible swelling or any surface degradation as determined by FTIR (Fourier Transmittance Infra Red). The liquid toner was comprised of an about 2% by weight dispersion of the following components in NORPAR™ (a hydrocarbon solvent): about 75% by weight of NUCREL™ resin (a polyacid), about 22% by weight of a cyan pigment (phthalocyanine), about 3% by weight of aluminum stearate as a charge control additive, and about 0.1% to about 0.3% by weight of a block copolymer of ethylhexylmethacrylate and hydrogen bromide salt of dimethylaminoethylmethacrylate as the charge director.

EXAMPLE II

A stainless steel belt having the same dimensions as in Example I was abraded with sand paper, then degreased, scrubbed with an abrasive cleaner, and thoroughly washed with water. An epoxy primer THIOXON 330/301™ was then applied to a thickness of 2 to 3 tenths of a mil (5 to 7.5 micrometers), air dried at ambient conditions for 30 minutes and baked at 150° C. for 30 minutes. Subsequently, the primed belt was provided with a coating of a grafted titamer. A grafted titamer composition was prepared by dissolving 250 g of VITON GF™ in 2.5 liters of methylethyl ketone (MEK) by stirring at room temperature. This is accomplished by using a four liter plastic bottle and a moving base shaker. It took approximately one hour to two hours to accomplish the dissolution. The above solution is then transferred to a four liter Erlenmeyer flask and 25 mil of the amine dehydrofluorinating agent, 3-(N-strylmethyl-2-aminoethylamino) propyltrimethoxysilane hydrochloride (S-1590, available from Huls America Inc.) was added. The contents of the flask were then stirred using a mechanical stirrer while maintaining the temperature between 55° C. and 60° C. After stirring for 30 minutes, 50 grams of ethoxy terminated polysiloxane (PS-393) and 50 grams of titanium isobutoxide both available from Huls America Inc. were added and stirring continued for another ten minutes. About 25 grams of acetic acid was then added. The stirring was continued while heating the contents of the flask at around 55° C. for another 4 hours. During this time the color of the solution turned light brown which then cooled to room temperature. To this solution was then added 5 grams of magnesium oxide, 2.5 grams of calcium hydroxide and 12.5 grams of E.I. DuPont CURATIVE VC50™. The above mixture was then ball jarred with ceramic balls as media for 17 hours. The mixture was diluted to 5 liters with methylethyl ketone. Next, a portion of the above dispersion was sprayed to a dry thickness of 4.5 mils onto the above belt to result in a belt overcoated with a grafted titamer composition. The resulting belt was then cured by the following heating profile: 2 hours at 93° C., 2 hours at 149° C., 2 hours at 177° C., and thereafter heating for 16 hours at 208° C. This belt was then cooled to room temperature.

Since determination of the mechanical properties of the grafted titamer film on the belt may be detrimental to the integrity of the belt, testing was performed on a separate grafted titamer film prepared by the following procedure: A part of the above grafted titamer dispersion (less than 2 liters) was spray coated onto a 10 inches×14 inches steel substrate. The dry film was then removed from the substrate by peeling and then cured by the above-mentioned heating procedure. The thickness of the cured film as determined by permoscope was found to be 9.8 mils. The mechanical properties were determined by Instron Model 1123 (Standard Test Protocol ASTM 412) and the toughness was found to be 3810 lb-in/in$^3$. The surface energy, determined by a Goniometer available from Ramehart, Inc. of New Jersey, was found to be 23.3 dynes/cm. The film when soaked in a liquid toner (having the same composition as the liquid toner used in Example I) for 24 hours at ambient temperature did not show any visible swelling or any surface degradation as determined by FTIR.

EXAMPLE III

The titamer and grafted titamer overcoated belts of Examples I and II were then placed in a laboratory liquid development test fixture, and the belts exhibited excellent transfer efficiencies, as measured by a densitometer RD918 available from Macbeth Inc. of New York, of almost 100 percent, and these belts had excellent characteristics enabling superior transfer of developed xerographic latent images. There was achieved with each of the belts excellent toner transfer efficiency, as measured with the Macbeth densitometer, of almost 100 percent from the photoreceptor to the belts and almost 100 percent from the belt to paper. The intermediate transfer members can be employed in an electrophotographic imaging system for electrostatic transfer of a toner image wherein the system comprises at least one image forming device, reference U.S. Ser. No. 957,140 (D/92071), the disclosure of which is totally incorporated herein by reference. Typically, four image forming devices are utilized. The image forming devices may each comprise an image receiving member in the form of a photoreceptor about which are positioned image forming components of the imaging structure. The image forming components further comprise exposure structures, developing structures, transfer structures, cleaning structures and charging structures. Charging structures can comprise conventional corona discharge devices. The intermediate transfer member of the invention, such as an intermediate transfer belt, is supported for movement in an endless path such that incremental portions thereof move past the image forming components for transfer of an image from each of the image receiving members. Each image forming component is positioned adjacent the intermediate transfer member for enabling sequential transfer of different color toner images to the intermediate transfer member in superimposed registration with one another.

Exposure structures employed can be any suitable type employed in the art. Typical exposure structures employed include, but are not limited to, raster input/output scanning devices (RIS/ROS) or any combination using the RIS/ROS devices. The light source employed can be any suitable light source employed in the art, such as a laser.

The intermediate transfer member is used in a manner that enables each incremental portion thereof to move past an image forming component. A color image component corresponding to a yellow component of an original document to be copied may be formed on the image receiving member (photosensitive drum or photoreceptor) using the charging structure, the exposure structure and the developing structure. The developing structure develops a yellow toner image on the image receiving member. A transfer structure, which can comprise a corona discharge device, serves to effect transfer of the yellow component of the image at the area of contact between the receiving member and the intermediate transfer member.

Also, in a similar manner, magenta, cyan and black image components corresponding to magenta, cyan and black components of the original document also can be formed on the intermediate transfer member one color on top of the other to produce a full color image.

The intermediate transfer member is moved through a transfer station wherein the multicolored image is electrostatically transferred to a transfer sheet or copy sheet. The transfer sheet or copy sheet itself may be electrostatically charged with a corotron device at the transfer station. The transfer sheet or copy sheet is moved into contact with the toner image at the transfer station. The sheet is advanced to the transfer station by any suitable sheet feeding apparatus. For example, feed rollers rotate so as to advance the uppermost sheet from a stack of sheets into contact with the intermediate transfer member in timed sequence so that the toner powder image thereon contacts the advancing sheet at the transfer station. At the transfer station, a Biased Transfer Roll (BTR) is used to provide good contact between the sheet and the toner image during transfer. A corona transfer device also can be provided for assisting the BTR in effecting image transfer. These imaging steps can occur simultaneously at different incremental portions of the intermediate transfer member.

Suitable devices in which the intermediate transfer member of the present invention can be employed include, but are not limited to, devices described in U.S. Pat. Nos. 3,893,761; 4,531,825; 4,684,238; 4,690,539; 5,119,140 and 5,099,286, the disclosures of which are totally incorporated herein by reference. The intermediate transfer member of the present invention can dissipate charge between toner image stations. It achieves transfer efficiencies of almost 100 percent and has nonstretch characteristics enabling good registration of a toner image.

COMPARATIVE EXAMPLE IV

Similar belts as those described in Examples I and II were prepared wherein the titamer/grafted titamer overcoating was replaced by an overcoating comprised of VITON B-50®, a material available from E.I. DuPont and believed to be a fluoropolymer comprised of a copolymer of vinylidene fluoride and hexafluoropropylene, and tetrafluoroethylene with a mole ratio of 61: 17:22.

A solution of VITON B-50® was prepared by dissolving 250 grams of the B-50 in 2.5 liters of methylethyl ketone (MEK) by stirring at room temperature, about 25° C. To 2 liters of this solution, there were added in a reaction vessel 2.2 grams of magnesium oxide, 1.1 grams of calcium hydroxide, 5.5 grams of E.I. DuPont CURATIVE VC50™, and 5 grams of carbon black N991 obtained from Vanderbilt Corporation. The contents of the vessel were ball milled with media for 17 hours. The resulting black dispersion was then spray coated onto a stainless steel primed belt and cured as in Examples I and II. This belt was comprised of the same components and of the same thicknesses as the belts of Examples I and II, differing only in the composition of the overcoating. This comparative belt was then incorporated into the liquid imaging apparatus of Example III and there was measured as indicated in Example III the following transfer efficiencies: 85 percent of the liquid toner transferred from the photoreceptor to the belt and 60 percent from the belt to paper.

Similarly, the above prepared belt may be incorporated into a laboratory dry toner developerment test fixture similar to a Xerox Corporation 5090 test fixture, and the toner transfer efficiency is predicted to be about 80 percent from the imaging member to the belt, and about 80 percent from the belt to paper.

Other modifications of the present invention may occur to those skilled in the art based upon a reading of the present disclosure and these modifications are intended to be included within the scope of the present invention.

I claim:

1. An intermediate toner transfer component comprising a substrate and a coating comprised of substantially uniform, integral, interpenetrating networks of haloelastomer, titanium oxide, and optionally polyorganosiloxane, wherein the component has an effective charge relaxation time to ensure efficient toner transfer.

2. The transfer component of claim 1, wherein the haloelastomer is a fluoroelastomer.

3. The transfer component of claim 2, wherein the fluoroelastomer is selected from the group consisting of poly- (vinylidene fluoride-hexafluoro-propylene) and poly(vinylidene fluoride-hexafluoropropylene-tetrafluoroethylene).

4. The transfer component of claim 1, wherein the coating is from about 8 to about 220 microns thick.

5. The transfer component of claim 1, wherein the component is in the form of an endless belt.

6. The transfer component of claim 1, further comprising an intermediate layer between the substrate and the coating, wherein the intermediate layer is an adhesive.

7. The transfer component of claim 6, wherein the adhesive is a silane coupling agent, a bisphenol A epoxy resin, or an amino functional siloxane.

8. The transfer component of claim 1, wherein the polyorganosiloxane is derived from a compound having the formula:

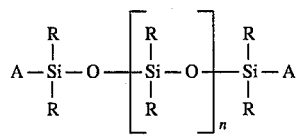

where R independently is an alkyl, alkenyl or aryl, wherein the aryl is optionally substituted with an amino, hydroxy, mercapto, alkyl or alkenyl group; the functional group A is a mono-, di- or trialkoxysilane, hydroxy, halogen, an alkene or alkyne wherein the alkene and alkyne of the functional group A are optionally substituted with an alkyl or aryl; and n represents the number of segments.

9. The transfer component of claim 8, wherein R is an alkyl having from 1 to 24 carbon atoms, alkenyl having from 2 to 24 carbon atoms or aryl having from 6 to 24 carbon atoms, wherein the aryl is optionally substituted with an amino, hydroxy, mercapto or alkyl having from 1 to 24 carbon atoms, or alkenyl group having from 2 to 24 carbon atoms; the functional group A is a mono-, di- or trialkoxysilane having from 1 to 10 carbon atoms in each alkoxy group, hydroxy, halogen, an alkene having from 2 to 8 carbon atoms, or alkyne having from 2 to 8 carbon atoms, wherein the alkene and alkyne of functional group A are optionally substituted with an alkyl having from 1 to 24 carbon atoms or aryl having from 6 to 24 carbon atoms; and n is from 2 to 350.

10. The transfer component of claim 1, wherein the substrate is a metal, a metal oxide, a thermoplastic or a thermosetting organic film.

11. The transfer component of claim 1, wherein the substrate comprises polyimide and optionally carbon black.

12. The transfer component of claim 1, wherein the coating further comprises an amine coupler.

13. An intermediate toner transfer component comprising a substrate and a coating comprised of substantially uniform, integral, interpenetrating networks of haloelastomer and titanium oxide, wherein the component has an effective charge relaxation time to ensure efficient toner transfer.

14. The transfer component of claim 13, wherein the haloelastomer is present in an amount ranging from about 99 to about 25% by weight based on the weight of the coating, and the titanium oxide network is present in an amount ranging from about 1 to about 50% by weight based on the weight of the coating.

15. The transfer component of claim 13, wherein the integral, interpenetrating networks of haloelastomer and titanium oxide are of the formula:

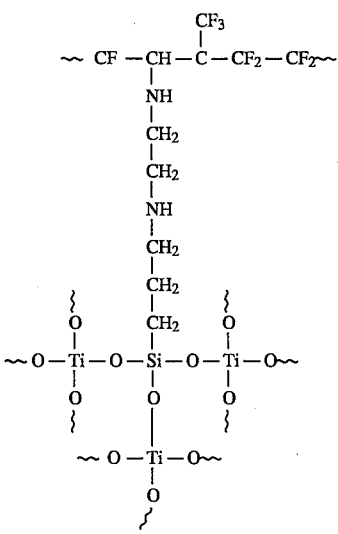

wherein the symbol ~ represents the continuation of the networks.

16. An intermediate toner transfer component comprising a substrate and a coating comprised of substantially uniform, integral, interpenetrating networks of haloelastomer, titanium oxide, and polyorganosiloxane, wherein the component has an effective charge relaxation time to ensure efficient toner transfer.

17. The transfer component of claim 16, wherein the integral interpenetrating networks of haloelastomer, titanium oxide, and polyorganosiloxane are of the formula:

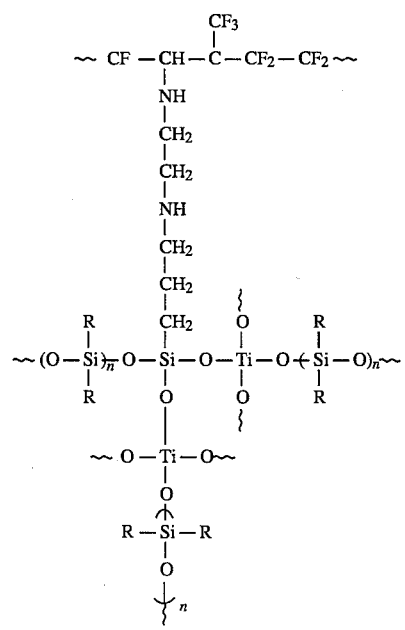

where R independently is an alkyl, alkenyl or aryl, wherein the aryl is optionally substituted with an amino, hydroxy, mercapto or alkyl or alkenyl group; and n represents the number of segment.

18. The transfer component of claim 15, wherein the haloelastomer is present in an amount ranging from about 99 to about 25% by weight based on the weight of the coating, the titanium oxide network is present in an amount ranging from about 1 to about 50% by weight based on the weight of the coating, and the polyorganosiloxane is present in an amount ranging from about 1 to about 50% by weight based on the weight of the coating.

* * * * *